Figure 1:
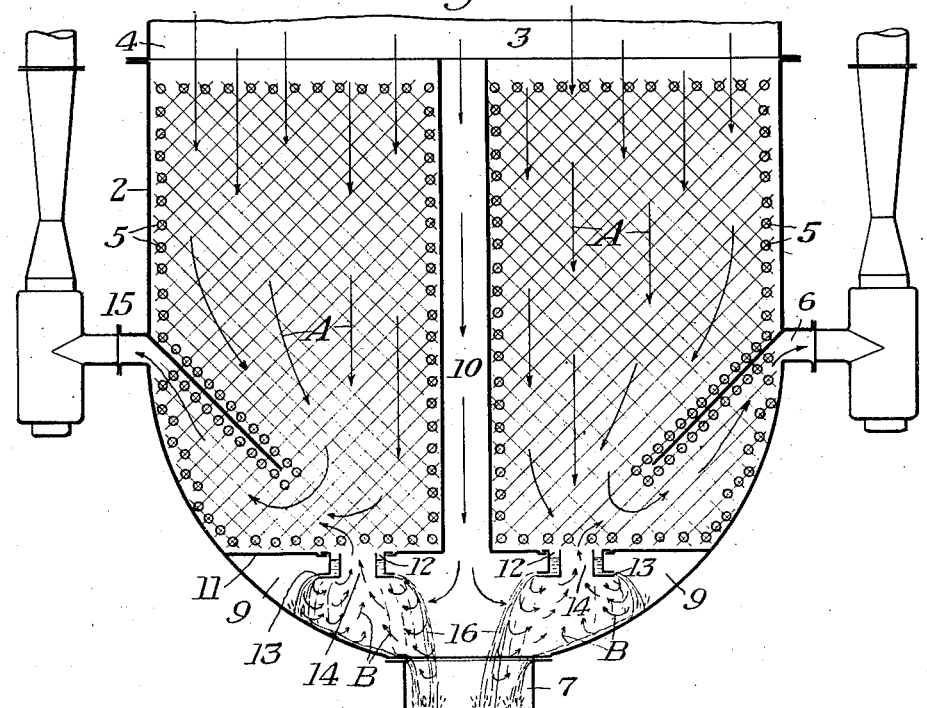

June 17, 1930.  R. N. EHRHART  1,764,782

CONDENSER

Filed April 23, 1924

INVENTOR
Raymond N. Ehrhart,
by Byrnes Stebbins Parmelee
his Attys.

Patented June 17, 1930

1,764,782

UNITED STATES PATENT OFFICE

RAYMOND N. EHRHART, OF EDGEWOOD, PENNSYLVANIA, ASSIGNOR TO ELLIOTT COMPANY, OF PITTSBURGH, PENNSYLVANIA, A CORPORATION OF PENNSYLVANIA

CONDENSER

Application filed April 23, 1924. Serial No. 708,425.

The present invention relates broadly to the problem of liquid treatment as accomplished by heat interchange, and more particularly as applied to condensers of the type adaptable for use in power plants and the like.

In modern steam power plants, engineers are coming to a realization that corrosion is a direct function of oxygen in the water, and that, therefore, the amount of dissolved air with its quota of oxygen should be kept to as low a value as possible in feed water. In this manner, circulation of the water through the component parts of a power plant system, such as feed water lines, steel tube economizers, boilers, and the like, may be accomplished with a minimum of corrosion. Steel tube economizers are particularly subject to corrosion where water with a high content of dissolved air is circulated through them. In order to obviate such corrosion, many power plants are now utilizing deaerators for removing the dissolved air from the feed water before it is given an opportunity to circulate through the parts of a system as referred to.

In the larger and more important power plants, surface condensers are quite commonly used, but it has been found that, even with air exhausting means used in connection with such condensers, the air content of the water leaving the same is too high to be effectively used in the system through which it must circulate. Extensive investigations have shown that the dissolved oxygen content of water delivered from well-known types of surface condensers is scarcely ever as low as .1 of a cubic centimeter per liter of water. Such air content is considered excessive and necessitates the use of a separate piece of deaerating apparatus for its removal. By the air or oxygen content of water is meant the proportional volumetric content at atmospheric pressure and ordinary temperatures, such as found with condensate from condensers as customarily operated.

It has been found that deaeration of water may be effectively and uniformly accomplished by subjecting the same to such conditions as to cause a change of phase or evaporation of a substantially definite percentage of all of the liquid being treated, irrespective of the amount. This invention broadly is made the subject-mater of the patent of William S. Elliott, No. 1,497,491 granted June 10, 1924. From a standpoint of heat economy in power plant operation, it is desirable to deliver condensate from condensers at temperatures as high as possible, in order to thereby conserve heat and reduce the amount of heat subsequently required for bringing the condensate to a temperature at which it may be effectively re-used. In the copending application of William S. Elliott, Serial No. 639,343, filed May 16, 1923, there is disclosed and claimed the method and apparatus for increasing the temperature of the condensate, and at the same time, effecting such a heating thereof as to produce the desired change of phase for successful deaeration. The present invention has for one of its objects improvements in apparatus of this general character.

In the accompanying drawings, there is shown, for purposes of illustration only, a preferred embodiment of the present invention, it being understood that the drawings do not define the limits of my invention, as changes in the construction and operation disclosed therein may be made without departing from the spirit of the invention or the scope of my broader claims.

In the drawings:—

Figure 2:
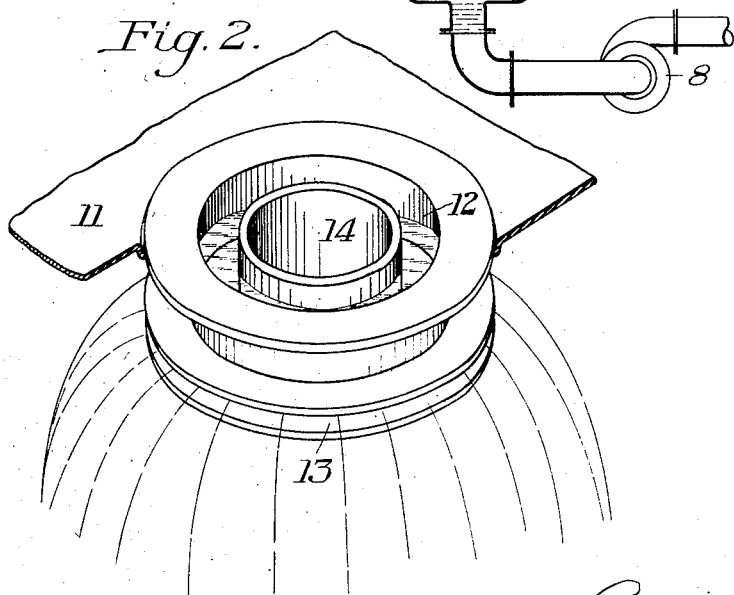

Figure 1 is a vertical sectional view through one form of condenser embodying the present invention, and Figure 2 is a detail view illustrating a portion of the jet condenser.

In accordance with the present invention, it is desirable to effect air separation or deaeration without the use of separate deaerating apparatus, the deaeration being accomplished within the condenser itself. It has been found that a condenser embodying the present invention will deliver condensate with oxygen contents as low as .025 cubic centimeter per liter, and only in very exceptional cases is the oxygen content as high as .1 cubic centimeter per liter. This is accomplished by heating the condensate in the condenser to boiling temperature, or substantially boiling temperature, by direct contact between the condensate and steam taken directly from a turbine exhaust or from the inlet passage to the condenser from the turbine or other prime mover. There is also produced a change in phase or evaporation of a definite percentage of the condensate. The invention, therefore, involves, first, the step of bringing the water to boiling temperature for accomplishing a partial deaeration, and a second step of evaporating a definite percentage thereof for accomplishing relatively complete deaeration.

These desirable results may be accomplished by providing a condenser shell 2 of any desired construction, having a vapor inlet 3 adapted to receive exhaust steam from a turbine or other prime mover having an outlet 4. Within the condenser shell, there is arranged a series of tubes or tube nests 5 adapted to receive cooling water, as well understood in the art, for condensing such steam. The condenser is provided with the usual outlet connections 6 leading to a pump or ejector for withdrawing the non-condensable gases from the condenser and maintaining the desired vacuum therein. There is also provided a hot well 7 from which the condensate may be withdrawn as desired by suitable means such as a pump 8.

Extending through the condenser, for conducting heating steam to a chamber 9 below the tubes, is a walled passage 10, the passage in the present case being illustrated as extending centrally of the condenser shell and communicating with the inlet 3 thereof.

The chamber 9 may be formed by providing a bottom partition 11 within the condenser having a series of substantially circular recesses 12 adapted to receive condensate and discharge the same in a substantially continuous film through an annular discharge 13. Extending preferably substantially centrally through each of the recesses 12 is a vapor offtake 14 communicating with the space within the film or shell of condensate discharged through the annular discharge opening.

In operation, steam admitted to the inlet 3 will flow through the condenser substantially in the manner indicated by the arrows A. As it traverses the condenser from top to bottom, the proportion of air in the steam becomes greater, so that by the time the flow has progressed to the outlets 6, connected to the exhausting means, practically all of the steam is condensed, thereby permitting the withdrawal only of non-condensable gases through the outlets. In order to have steam flow from the vapor inlet to the lower portion of the condenser, it is necessary to have a lower pressure in the lower portion of the condenser than in the inlet 3. Likewise, at intermediate points, it is necessary to provide lower pressure conditions than in the inlet, and these conditions are realized by the provision of the exhausting means connected to the outlets 6 effective for withdrawing non-condensable vapors from substantially the bottom of the tube nests.

The condensate or condensed vapor formed within the condenser shell drips down through the tube nests, finding its way to the orifices 13. Heating steam flows through the passage 10 to the chamber 9 and thence must travel through the films or walls of condensate discharged from the orifices 13. This steam, in direct contact with the condensate, increases its temperature to the boiling point and is substantially completely condensed, whereby the vapor outlets 14 initially tend to withdraw vapor from a zone wherein the heating medium has undergone substantially complete condensation.

By providing operation conditions of such nature that the pressure at the outlets 6 is materially lower than the pressure either in the inlet 3 or in the chamber 9, and by proportioning the passage 10 so that considerable steam can traverse the same without any material loss in pressure, I am able to heat the condensate within the chamber 9 substantially to the temperature of the steam in the inlet 3. It will be understood that the recesses 12 with their cooperating discharge orifices serve as jet condensers bringing condensate into intimate contact with the heating medium. If a jet condenser is equipped with a comparatively small air exhausting means, but little vapor will be drawn from the condenser, and as a result, the temperature difference between the steam and the heated water will be found to be comparatively great. On the other hand, if a larger air exhausting means is provided, it will serve to withdraw the air more effectively and the temperature of the steam and the heated water will approach one another more closely. At the same time, the amount of vapor withdrawn from the condenser will increase considerably inasmuch as the saturation content of the air is considerably increased as its temperature approaches the natural boiling point of the hot water in the condenser. To go to the other extreme, if an exhausting means of excessive size is provided, the temperature of the vapor being condensed and the water that accomplishes the condensation will be substantially the same, and there will be produced an actual evaporation of a certain amount of the heated water, depending, of course, on the actual size of the exhausting means. I take advantage of this operation in the present condenser to effect an evaporation of a portion of the condensate as will be hereinafter more fully pointed out.

In any condenser of the surface type, it is desirable, in order to give quicker starting to provide air exhausting means which is excessively large for the normal operating conditions. In other words, in order to evacuate the tremendous volume from the systems of large condensers, it is very desirable to provide exhausting means of very large size to accomplish such evacuation in a reasonable time. If such exhausting means is provided during the normal operation of the condenser, there is a considerable residual capacity in the exhausting means. In accordance with the present invention, there is provided exhausting means 15 of this character co-operating with each of the outlets 6. This residual air pumping capacity is effective for serving the jet condensers discharging into the chamber 9 and is substantially a hundred times as large as normally considered necessary for commercial operation of jet condensers. In operation, therefore, the condensate will be heated substantially to the boiling point by means of steam traversing the passage 10 and then, by the excessive air exhausting capacity serving the small jet condensers, there is produced a re-evaporation of a certain portion of the condensate, thereby resulting in a condensate with a very low oxygen content in the hot well. It is my belief that this re-evaporation may occur from the inner surface of the film 16 discharged from each jet condenser, substantially as indicated by the arrows B, although, due to the agitation of the condensate as it passes through the jet condensers, this results in a change of phase of a definite percentage of the total amount of condensate as required for effective deaeration.

In accordance with the preferred method of carrying out the present invention, the jet condensers will be comparatively few in number for each condenser, thereby compelling the heated condensate to flow over the bottom of the condenser shell in thin films of considerable area, enabling it to give up a material amount of air by so doing. For example, in a condenser eighteen feet in length, there might be conveniently provided three jet condensers, one located near each end, and the other near the center, thereby causing an effective breaking up of the condensate into thin films and permitting effective air removal therefrom.

The advantages of the present invention arise from the provision of a condenser having means for simultaneously increasing the temperature of the condensate and effecting such a change in phase thereof as to result in substantial and uniform deaeration.

Further advantages of the invention arise from the provision of a vapor offtake for the jet condensers adapted to withdraw from a point of substantially complete condensation of the steam. This construction further prevents flooding the lower tubes of the condensers with free steam in a manner such as to interfere with the full capacity range thereof.

I claim:

1. In a surface condenser, a tube nest, means for conducting steam from the point of substantially highest pressure in said condenser to a point adjacent the region of lowest pressure therein out of contact with the tubes of said tube nest, and means for conducting the condensate formed by said tube nest to said region out of contact with said steam and bringing the condensate and said steam into direct contact for the first time in said region.

2. In a surface condenser, a tube nest, means for conveying steam from a region of relatively high absolute pressure to a region of relatively low absolute pressure, means for delivering condensate to said region of relatively low absolute pressure in such manner as to form a zone substantially completely enclosed and surrounded by the condensate, and means for subjecting such zone to a reduced pressure condition.

3. In a surface condenser, a bottom plate having openings formed therein of such nature as to provide a condensate discharge therethrough in the form of an endless wall enclosing an evaporation zone for each opening, and means for subjecting each zone to a reduced pressure condition such that a portion of the condensate immediately contiguous thereto is immediately evaporated.

4. In a surface condenser, a plurality of tubes therein, a walled conduit extending substantially vertically through said tubes and dividing the condenser into a plurality of separate condensing chambers located in a common horizontal plane, a plurality of air outlets communicating with said chambers, and a plurality of air withdrawing means operatively connected with said outlets.

5. In a surface condenser, a shell, a walled conduit extending substantially vertically through said shell and dividing the space therein into a plurality of condensing chambers each providing a converging steam path in the direction of flow, a plurality of air outlets connecting with said chambers, and a plurality of air withdrawing means operatively connected with said outlets, said shell having an inlet common to said chambers and said conduit.

6. In a surface condenser, a tube nest, means for conveying steam from substantially the region of highest pressure in said condenser to a region adjacent that of lowest pressure, means for delivering condensate to said second mentioned region in such manner as to form by the condensate a defined enclosed evaporating zone, and means for subjecting the interior of such zone to a reduced pressure condition such that a portion of the condensate immediately contiguous thereto is evaporated.

RAYMOND N. EHRHART.